United States Patent
Senkal et al.

(10) Patent No.: US 10,180,323 B2
(45) Date of Patent: Jan. 15, 2019

(54) AXI-SYMMETRIC SMALL-FOOTPRINT GYROSCOPE WITH INTERCHANGEABLE WHOLE-ANGLE AND RATE OPERATION

(71) Applicant: The Regents of the University of California, Oakland, CA (US)

(72) Inventors: Doruk Senkal, Irvine, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 686 days.

(21) Appl. No.: 14/734,794

(22) Filed: Jun. 9, 2015

(65) Prior Publication Data

US 2015/0354959 A1   Dec. 10, 2015

Related U.S. Application Data

(60) Provisional application No. 62/009,764, filed on Jun. 9, 2014.

(51) Int. Cl.
*G01C 19/5684* (2012.01)

(52) U.S. Cl.
CPC ................. *G01C 19/5684* (2013.01)

(58) Field of Classification Search
CPC .................................... G01C 19/5684
See application file for complete search history.

(56) References Cited

U.S. PATENT DOCUMENTS 5,226,321 A     7/1993  Varnham
9,851,373 B2 *  12/2017 Fujimoto ............ G01P 9/04
9,917,571 B2 *  3/2018  Ayazi ................ H03J 1/06
2005/0150296 A1 * 7/2005 Painter .............. G01C 19/5719
                                                    73/504.12
2010/0024546 A1 * 2/2010 Challoner .......... G01C 19/5684
                                                    73/504.08

(Continued)

OTHER PUBLICATIONS

Challoner et al., Boeing Disc Resonator Gyroscope, IEEE/ION Position Location and Navigation Symposium, 2014, p. 504-514, Savannah, Georgia USA.

(Continued)

*Primary Examiner* — Natalie Huls
(74) *Attorney, Agent, or Firm* — Marcus C. Dawes; Daniel L. Dawes

(57) ABSTRACT

A toroidal ring gyroscope with a robust outer perimeter anchor and a distributed suspension system. The vibrational energy in the design is concentrated towards the innermost ring, and the device is anchored at the outer perimeter. The distributed support structure prevents vibrational motion propagating to the outer anchor, which helps trap the vibrational energy within the gyroscope and provides a Q-factor of >100,000 at a compact size of 1760 μm. Due to the parametric pumping effect, energy added to each mode is proportional to the existing amplitude of the respective mode. As a result, errors associated with finding the orientation of the standing wave and x-y drive gain drift are bypassed. The toroidal ring gyroscope can be fabricated using any standard silicon on insulator process. Due to the high Q-factor and robust support structure, the device can potentially be instrumented in high-g environments that require high angular rate sensitivity.

12 Claims, 9 Drawing Sheets

(56) References Cited

U.S. PATENT DOCUMENTS

| | | | |
|---|---|---|---|
| 2010/0071465 A1* | 3/2010 | Stewart | G01C 19/5684 73/504.02 |
| 2010/0107761 A1* | 5/2010 | Ofri | G01C 19/5684 73/504.13 |
| 2010/0218606 A1* | 9/2010 | Fell | G01C 19/5684 73/504.13 |
| 2011/0041606 A1* | 2/2011 | Ikeda | G01C 19/5684 73/504.12 |
| 2013/0192368 A1* | 8/2013 | Fell | G01C 19/5684 73/504.13 |
| 2014/0224016 A1* | 8/2014 | Leclerc | G01C 19/5712 73/504.12 |
| 2015/0040663 A1* | 2/2015 | Fell | G01C 19/5684 73/504.04 |
| 2015/0128701 A1* | 5/2015 | Vohra | G01C 19/5684 73/504.12 |
| 2015/0192415 A1* | 7/2015 | Ge | G01C 19/5684 73/504.13 |
| 2015/0211855 A1* | 7/2015 | Ruohio | G01C 19/5712 73/504.12 |
| 2016/0123735 A1* | 5/2016 | Gregory | G01C 19/5684 73/504.13 |
| 2016/0153779 A1* | 6/2016 | Vohra | G01C 19/5698 73/504.12 |
| 2017/0038211 A1* | 2/2017 | Ayazi | H03J 1/06 |
| 2017/0067742 A1* | 3/2017 | Zotov | G01C 19/5684 |
| 2017/0227572 A1* | 8/2017 | Malvern | G01C 19/5762 |

OTHER PUBLICATIONS

Ayazi et al., Design and Fabrication of High-Performance Polysilicon Vibrating Ring Gyroscope, IEEE International Conference on Micro Electro Mechanical Systems, 1998.

Hao et al., VHF Single-Crystal Silicon Elliptic Bulk-Mode Capacitive Disk Resonators—Part I: Design and Modeling, IEEE Journal of Microelectromechanical Systems, 2004, p. 1043.

Senkal et al., 100k Q-Factor Toroidal Ring Gyroscope Implemented in Wafter-Level Epitaxial Silicon Encapsulation Process, IEEE International Conference on Micro Electro Mechanical Systems, pp. 24-27, Jan. 26-30, 2014.

Senkal et al., Parametric Drive of a Toroidal MEMS Rate Integrating Gyroscope Demonstrating 20 ppm Scale Factor Stability, IEEE International Conference on Micro Electro Mechanical Systems, pp. 29-32, Jan. 18-22, 2015.

Candler et al., Long-Term and Accelerated Life Testing of a Novel Single-Wafer Vacuum Encapsulation for MEMS Resonators, IEEE Journal of Microelectromechanical Systems, 2006.

Rozelle, The Hemispherical Resonator Gyro: From Wineglass to the Planets, AAS/AIAA Space Flight Mechanics Meeting, 2009, p. 1157-1178.

Lynch, Coriolis Vibratory Gyroscopes, Symposium Gyro Technology, 1998, Stuttgart, Germany.

Harish et al., Experimental Investigation of Parametric and Externally Forced Motion in Resonant MEMS Sensors, Journal of Micromechanics and Microengineering, 2009, 19(1):0150.

Lynch, Vibratory Gyro Analysis by the Method of Averaging, Saintt Petersburg Conference on Gyroscopic Technology and Navigation, 1995, p. 26-34, Russia.

Oropeza-Ramos et al., Robust Micro-rate Sensor Actuated by Parametric Resonance, Sensors and Actuators A: Physical, 2009, 152(1):80-87.

Senkal et al., 1 Million Q-Factor Demonstrated on Micro-Glassblown Fused Silica Wineglass Resonators with Out-of-Plane Electrostatic Transduction, Solid-State Sensors, Actuators and Microsystems Workshop, pp. 68-71, Jun. 8-12, 2014.

Ahn et al., Geometric Compensation of (100) Single Crystal Silicon Disk Resonating Gyroscope for Mode-Matching, IEEE Transducers 2013, 2013, p. 1723-1726, Spain.

Cho et al., A High-Q Birdbath Resonator Gyroscope (BRG), IEEE Transducers 2013, 2013, p. 1847-1850, Spain.

Ng et al., Localized, Degenerately Doped Epitaxial Silicon for Temperature Compensation of Resonant MEMS Systems, IEEE Transducers 2013, 2013, p. 2419-2422, Spain.

Nitzan et al., Epitaxially-Encapsulated Polysilicon Disk Resonator Gyroscope, IEEE MEMS 2013, 2013, p. 625-628, Taiwan.

Su et al., Silicon MEMS Disk Resonator Gyrocope with an Integrated CMOS Analog Front-End, IEEE Sensors Journal, 2014, p. 3426-3432, vol. 14, No. 10.

Ng et al., Stability Measurements of Silicon MEMS Resonant Thermometers, IEEE, 2011.

Hong et al., High-Stress Fatigue Experiments on Single Crystal Silicon in an Oxygen-Free Environment, Solid-State Sensors, Actuators, and Microsystems: Workshop, 2012, p. 453.

\* cited by examiner

AXI-SYMMETRIC SMALL-FOOTPRINT GYROSCOPE WITH INTERCHANGEABLE WHOLE-ANGLE AND RATE OPERATION

RELATED APPLICATIONS

This application is related pursuant to 35 USC 119 to U.S. provisional patent application Ser. No. 62/009,764, filed on Jun. 9, 2014, incorporated herein by reference.

BACKGROUND

Field of the Technology

The current invention relates to micromachined gyroscopes, in particular a toroidal ring gyroscope with a robust ring anchor and a distributed suspension system.

Description of the Prior Art

Coriolis Vibratory Gyroscopes (CVGs) can be divided into two broad categories based on the gyroscope's mechanical element: Degenerate mode gyroscopes which have x-y symmetry ($\Delta f=0$ Hz ideal) and non-degenerate mode gyroscopes which are designed intentionally to be asymmetric in x and y modes ($\Delta f \neq 0$ Hz). Degenerate mode CVGs have potential advantages over non-degenerate mode CVGs in terms of rate sensitivity, signal to noise ratio, power consumption, and potential to implement whole angle mechanization. However, mechanical elements with high-Q factor and very good frequency symmetry are required to utilize these advantages.

Realizing this potential, many MEMS degenerate mode gyroscopes have emerged in the recent years. For example, high aspect ratio ring gyroscopes have been demonstrated. A cylindrical rate integrating gyroscope with a Q-factor of ~21,800 at 2.5 mm diameter has been demonstrated, along with a high frequency poly-silicon disk resonator gyroscope (DRG) with a Q-factor of ~50 k at 264 kHz and 600 µm diameter was presented. Later a crystalline-silicon version of similar geometry was demonstrated with Q-factor ~100 k. Q-factors as high as 1 million was demonstrated on a quadruple mass gyroscope (QMG), however the device had a 9 mm×9 mm footprint. Despite these successful implementations of degenerate mode operation, obtaining a high-Q factor in a compact volume remains to be a challenge due to factors such as support losses, thermo-elastic dissipation, and viscous damping.

Axi-Symmetric MEMS Gyroscopes Operating in Wineglass Modes

Axi-symmetric MEMS gyroscopes fabricated using lithography and deep reactive etching (DRIE) of silicon are well known. These devices typically consist of extruded 2-D geometries (rings, disks, concentric rings etc.), that operate on n=2 and n=3 wineglass modes.

One such device is a micro-machined angle-measuring gyroscope. The design employs multiple concentric ring structures and additional electrodes in the form of parallel plates to increase the effective mass (hence potentially the Q-factor) of the resonator and the total available capacitance of the drive and sense modes. Designs that employ central anchor points as well as outer anchors have also been proposed. A control algorithm for whole-angle operation have also been included, complete with parametric drive and quadrature compensation loops. Parametric excitation of oscillations is the excitation of oscillations in an oscillatory system through the periodic variation of the value of one of the system's oscillation parameters, that is the parameters on whose values the system's potential energy, kinetic energy, and period of natural oscillations essentially depend.

Another such iteration have been poly-silicon ring gyroscopes using the high aspect-ratio combined poly and single-crystal silicon process (HARPSS). The HARPSS process can create very high aspect ratio capacitive gaps (as low as 50 nm) using a sacrificial $SiO_2$ layer and PECVD poly-silicon on side walls of the capacitive gaps. The main body of the gyroscope consists of a ring structure that is supported by support springs and a center anchor. The ring gyro had 1.1 mm outer diameter and a device layer thickness of 80 µm with a 120 µm diameter central post and 1.4 µm capacitive gaps. A large frequency split was observed between the two degenerate n=2 wineglass modes, which is associated to the $\cos(4\Theta)$ modulus of elasticity dependence of single crystal-line silicon, thickness modulation along the perimeter of the ring was proposed to combat this effect. Electrostatic testing revealed a Q-factor of 20000 at 27.3 kHz. Minimum detectable signal was measured as 0.04 deg/sec at 10 Hz bandwidth, limited by the noise in the interface electronics.

Bulk acoustic wave silicon disk gyroscopes have also been previously demonstrated. As opposed to most flexural type gyroscopes the bulk acoustic wave disk gyroscopes operate in the MHz range. Lower amplitude of motion due to the higher frequency and stiffness of the resonant modes is compensated by the use of HARPSS process to create extremely small capacitive gaps of 250 nm. Disk gyroscopes with a diameter of 800 µm were fabricated on a 50 µm single crystal silicon device layer. Electrostatic frequency sweeps of the n=3 mode revealed a Q-factor of approximately 200000 at 5.9 MHz. A bias stability of 0.175°/s was obtained at approximately 2.5 s through Root Allan Variance Analysis.

Another example in the prior art is a single-crystal-silicon cylindrical rate integrated gyroscope (CING) using a silicon on glass (SOG) process. The device consists of concentric silicon cylinders (rings) that are connected to each other through a silicon back-plate, providing an order of magnitude increase in effective proof mass over a ring gyroscope. Electrostatic testing of a 2.5 mm radius LING revealed Q-factors on the order of 20000 at 17.9 kHz with a frequency split ($\Delta f$) of approximately 10 Hz or relative frequency split of 0.58% ($\Delta f_{n=2}/f_{n=2}$). A 6 mm radius version was later fabricated with Q-factors up to about 100000. The gyroscope was later mode-matched and operated in whole-angle mode using a commercial defined radio hardware. Root ALLAN variance analysis showed a bias stability of 153_=s. However it was later found out that the gyroscope has very low angle gain of 0.011 due to the fact that majority of the kinetic energy is stored in the out of plane mode.

Using a similar approach, a poly-silicon disk resonator gyroscope (DRG) have been demonstrated. The device consists of multiple concentric rings that act both as the proof mass and a distributed spring structure. The DRG in this work had 0.6 mm diameter with a 20 µm device layer and 1.5 µm capacitive gaps. A wafer-level epitaxial poly-silicon encapsulation process was used to vacuum package the gyroscope during fabrication. A Q-factor of approximately 60000 was observed at about 264 kHz. Rate mode operation using the n=2 wineglass mode showed a bias stability of 3.29°/hr at 292 s.

BRIEF SUMMARY

In this disclosure, we present a toroidal ring gyroscope with a robust outer perimeter anchor and a distributed suspension system. In contrast to axi-symmetric designs with central support structures, we explore an alternative support structure for anchor loss minimization. The vibrational energy in the introduced design is concentrated towards the innermost ring, and the device is anchored at the outer perimeter. The distributed support structure prevents vibrational motion propagating to the outer anchor, which helps trap the vibrational energy within the gyroscope and provides a Q-factor of >100,000 at a compact size of 1760 µm.

In addition, we explore parametric drive of Toroidal Ring Gyroscope during rate integrating operation for reduction of drifts induced by drive electronics. In contrast to the conventional amplitude control architecture used in the art, the central star electrode of the gyroscope, connected to a single drive channel was utilized for amplitude control of both modes. Due to the parametric pumping effect, energy added to each (x and y) mode is proportional to the existing amplitude of the respective mode. As a result, errors associated with finding the orientation of the standing wave and x-y drive gain drift are bypassed. Compared to conventional x-y drive architecture, as high as 14× improvement in scale factor stability was observed with parametric pumping, resulting in better than 20 ppm scale factor stability without any compensation or temperature stabilization.

The toroidal ring gyroscope can be fabricated using any standard silicon on insulator (SOI) process. Due to the high Q-factor and robust support structure, the device can potentially be instrumented in high-g environments that require high angular rate sensitivity.

The invention provides for a micromachined Coriolis vibratory ring gyroscope. The gyroscope includes a toroidal outer anchor and a distributed suspension system having an innermost portion that is disposed within and coupled to the toroidal outer anchor. The gyroscope further includes an electrode assembly disposed in the center of the distributed suspension system and a capacitive gap between the electrode assembly and the innermost portion of the distributed suspension system, the electrode assembly further configured for driving the distributed suspension system into oscillation by electrostatic forces.

In one particular embodiment, the distributed suspension of the gyroscope includes a plurality of concentrically disposed rings coupled to one another. The most concentrically disposed innermost ring of the plurality of rings has a greater thickness than the remaining plurality of concentrically disposed rings. The capacitive gap between the innermost portion of the distributed suspension system and the electrode assembly in this embodiment is a capacitive gap between the innermost ring of the distributed suspension system which has greater thickness and the driving electrode assembly.

In another embodiment, the electrode assembly of the gyroscope includes a central star electrode and at least eight discrete electrodes symmetrically disposed radially around the central star electrode. At least four of the at least eight discrete electrodes may be forcer electrodes and at least four of the at least eight discrete electrodes may be pick-off electrodes. The central star electrode may also be configured for parametric pumping of the distributed suspension system.

In yet another embodiment, the gyroscope also includes a micro-controller configured to drive the gyroscope at a constant amplitude, suppress a quadrature error, and track and control orientation of a precession pattern of the gyroscope.

In still another embodiment, the gyroscope has a Q factor of at least 100,000 and an overall diameter of no more than 1760 µm.

In another embodiment, the electrode assembly driving the distributed suspension system into oscillation by electrostatic forces includes an electrode assembly driving the gyroscope in any of a plurality of wineglass modes provided that the wineglass mode shape has a degenerate mode pair.

In a related embodiment, the plurality of concentrically disposed rings are coupled to one another via a plurality of radially disposed spokes.

The invention also provides for a method of operating a gyroscope by anchoring a distributed suspension system to a toroidal outer anchor, defining a capacitive gap between the distributed suspension system and an electrode assembly disposed within the toroidal outer anchor, and driving the distributed suspension system with the electrode assembly into oscillation via electrostatic forces.

In one embodiment, the method step of anchoring a distributed suspension system to a toroidal outer anchor includes concentrically coupling the distributed suspension system to the toroidal outer anchor.

In another embodiment, the method step of defining a capacitive gap between the distributed suspension system and an electrode assembly includes disposing the electrode assembly adjacently to an innermost concentrically disposed ring within the distributed suspension system.

In yet another embodiment, the method step of driving the distributed suspension system with the electrode assembly into oscillation via electrostatic forces includes driving the distributed suspension system with the electrode assembly using more than one discrete electrodes disposed symmetrically around a central star electrode. This embodiment further allows the central star electrode to possibly drive the distributed suspension system by parametric pumping.

The invention further provides a method for driving a toroidal ring gyroscope including driving the gyroscope to a predetermined amplitude using an at resonance drive signal, stabilizing the phase lock loop and amplitude gain control, disabling the resonance drive signal, and driving the gyroscope through a parametric drive signal.

In one embodiment, the method step of driving the gyroscope through the parametric drive signal includes driving the gyroscope in any of a plurality of wineglass modes provided that the wineglass mode shape has a degenerate mode pair.

In another embodiment, the method step of driving the gyroscope through the parametric drive signal includes driving the gyroscope by an electrode assembly configured for parametric pumping. Driving the gyroscope by an electrode assembly configured for parametric pumping may also comprise driving the gyroscope by an electrode assembly comprised of at least four forcer electrodes. Alternatively, driving the gyroscope by an electrode assembly configured for parametric pumping also includes driving the gyroscope by an electrode assembly comprised of at least four pick-off electrodes.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The current invention is a new type of degenerate mode gyroscope with measured Q-factor of >100,000 on both modes at a compact size of 1760 µm diameter. The toroidal ring gyroscope of the current invention consists of an outer anchor ring, concentric rings nested inside the anchor ring and an electrode assembly at the inner core. Current implementation uses n=3 wineglass mode, which is inherently robust to fabrication asymmetries. Over the 4 devices tested, lowest as fabricated frequency split was found to be 8.5 Hz (122 ppm) with a mean of 21 Hz ($\Delta f/f$=300 ppm). Further electrostatic tuning brought the frequency split below 100 mHz (<2 ppm). Whole angle mechanization and pattern angle was demonstrated using a high speed DSP control system. Characterization of the gyro performance using force-rebalance mechanization revealed ARW of 0.047°/√hr and an in-run bias stability of 0.65 deg/hr. Due to the high Q-factor and robust support structure, the device can potentially be instrumented in whole angle mechanization for applications which require high rate sensitivity and robustness to g-forces.

Figure 1:
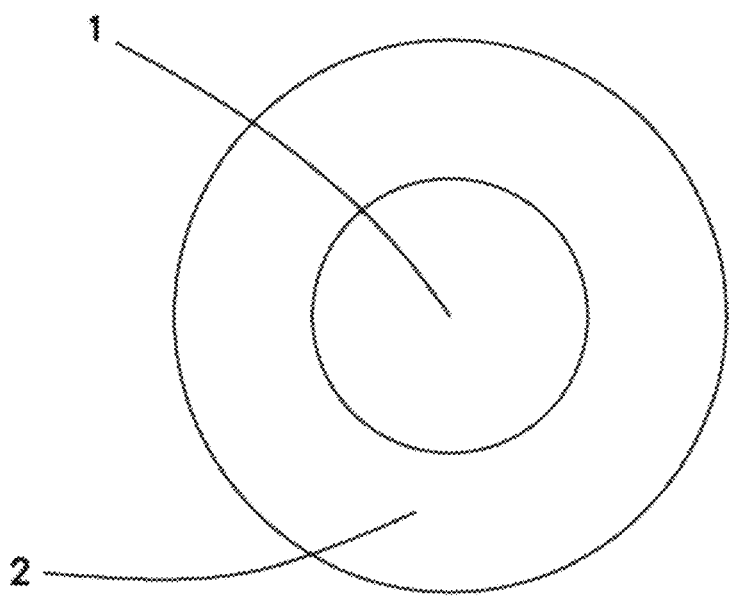
FIG. 1 is a conceptual depiction of a disk or ring gyroscope used in the prior art, the disk gyroscope comprising a central anchor surrounded by vibratory element.

Turning to FIG. 1, a disk or ring gyro of the prior art may be seen. Here, the disk/ring gyro comprises a central anchor 1 surrounded by a concentric vibratory element 2. The resulting structure of the prior art propagates vibrational motion to the central anchor 1, which leads to the vibrational energy from leaving the gyroscope.

Figure 2:
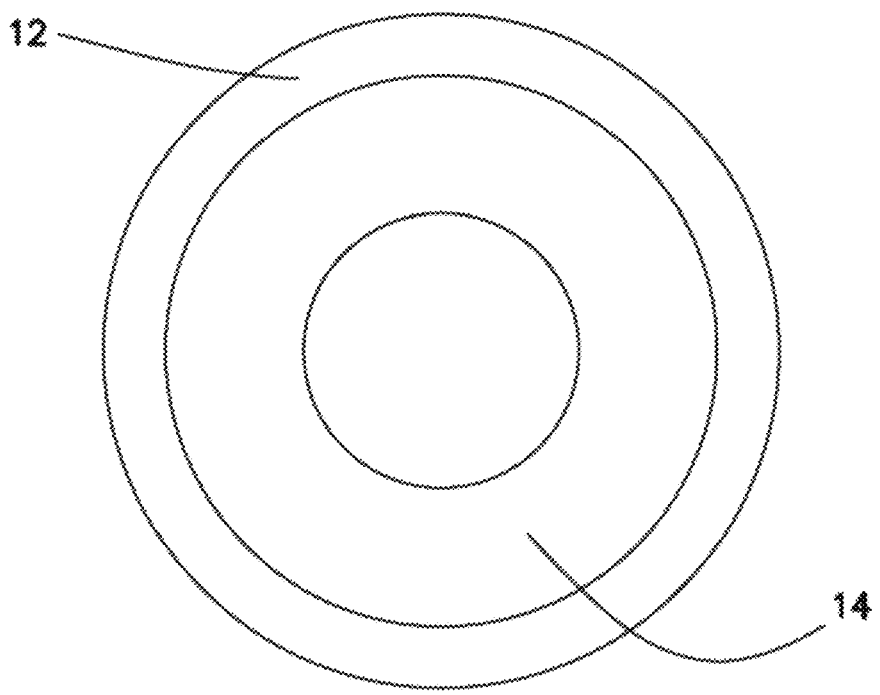
FIG. 2 is a conceptual depiction of the current toroidal ring gyroscope comprising a distributed suspension system surrounded by a concentric ring anchor.
Figure 3:
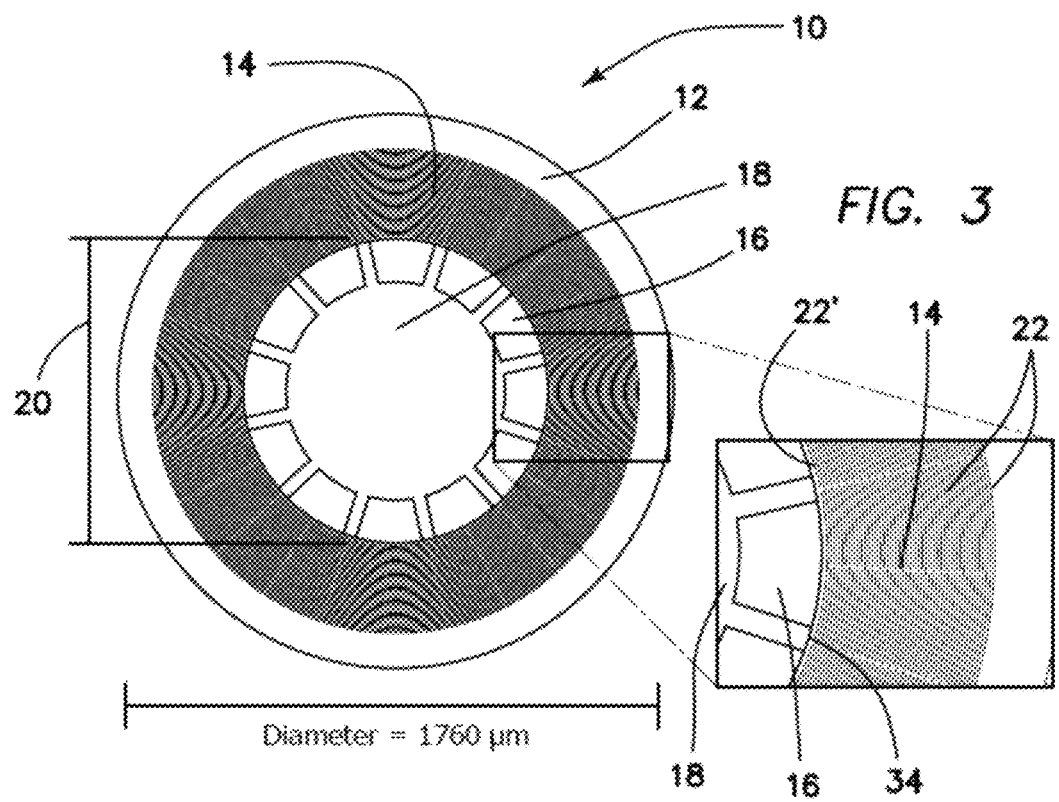
FIG. 3 is a top down schematic view and a magnified view of a portion thereof of the toroidal ring gyroscope comprising a distributed suspension system surrounded by a concentric ring anchor.
Figure 4:
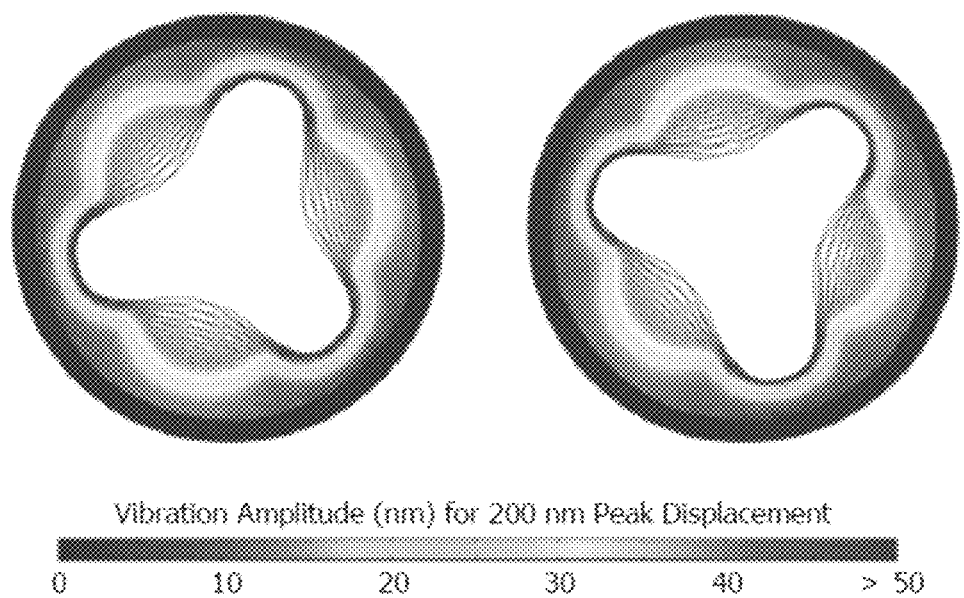
FIG. 4 is a graphical representation of the vibration amplitude in nanometers for 200 nm peak displacement of the gyroscope seen in FIG. 3.

The current toroidal ring gyroscope generally denoted by reference numeral 10 comprises an outer ring anchor 12 that encircles the device 10 including a distributed suspension system 14 and an inner electrode assembly 20 as best seen in FIGS. 2 and 3. As opposed to axi symmetric devices in the prior art with central support structures, vibrational energy is concentrated at the innermost ring of the gyroscope 10 as seen in the amplitude diagram of FIG. 4. As also seen in FIG. 4, the distributed suspension system 14 decouples the vibrational motion from a substrate which the outer ring anchor 12 is coupled to. This decoupling mitigates anchor losses into the substrate and prevents die/package stresses from propagating into the vibratory structure.

The Toroidal Ring Gyroscope (TRG) 10 was fabricated using a wafer-level epitaxial silicon encapsulation process such as EpiSeal. The EpiSeal process utilizes epitaxially grown silicon to seal the device layer at extremely high temperatures, which results in an ultra-clean wafer-level seal. This results in high vacuum levels (as low as 1 Pa) without the need for getter materials for absorption of sealing by-products.

The TRG 10 was fabricated on single-crystal silicon wafers. For this reason the gyroscope 10 was designed to operate in n=3 wineglass modes instead of the more commonly used lower order n=2 wineglass modes. This eliminates frequency split induced by anisotropic modulus of elasticity of crystalline silicon and makes the frequency splits (f) insensitive to misalignment errors in crystalline orientation of the silicon wafer. The draw-back of operation in n=3 modes are slightly lower angular gain factor, higher resonance frequency and smaller amplitude of motion.

The TRG 10 was fabricated on a 2 mm×2 mm die, the mechanical element has an outer diameter of 1760 µm and was fabricated on a device layer thickness of 40 µm. The distributed suspension system 14 comprises 44 concentric suspension rings 22. The suspension rings 22 are connected to each other using two spokes between the rings 22, the spokes are interleaved with an offset of 15° between two consecutive rings 22. The suspension rings 22 have a thickness of 5 µm with the innermost ring 22' having a slightly higher ring thickness of 8.5 µm, which mitigates the effect of the spokes on the overall mode shape and helps retain a truer wineglass shape at the electrode interface.

Table 1 summarizes the geometric parameters of the components which comprise the distributed suspension system 14.

TABLE 1

| Device diameter | (µm) | 1760 |
| --- | --- | --- |
| Device layer thickness | (µm) | 40 |
| Capacitive gaps | (µm) | 1.5 |
| Ring thickness | (µm) | 5 |
| Innermost ring thickness | (µm) | 8.5 |
| Number of rings | | 44 |

Figure 5:
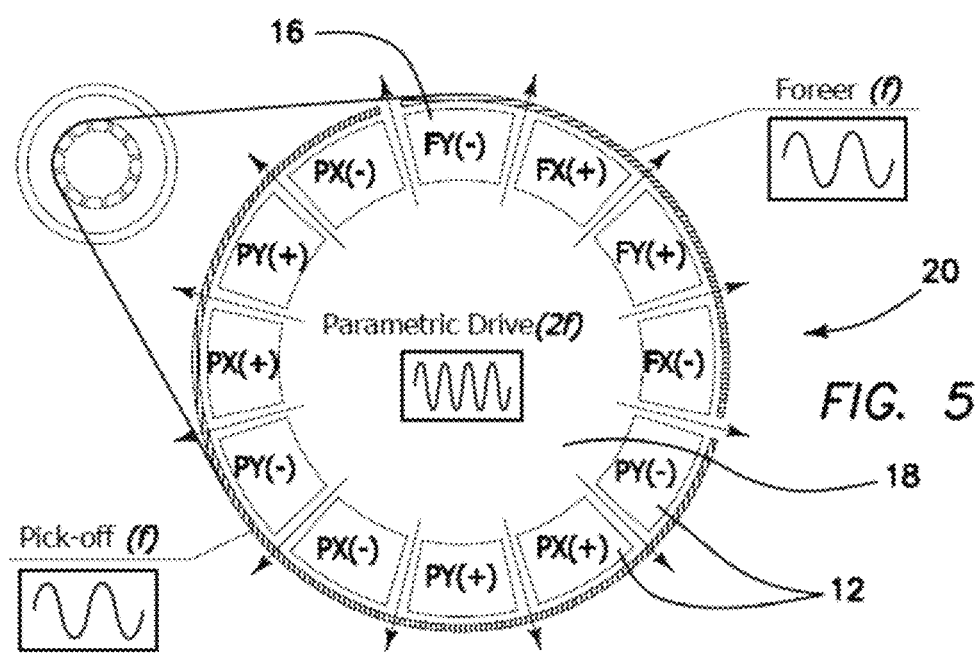
FIG. 5 is a schematic diagram depicting the electrode assembly portion of the gyroscope seen in FIG. 3, specifically the electrode assembly is seen as being divided into four drive and eight pick-off electrodes and one star shaped parametric electrode.

The electrode assembly 20 is located at the center of the TRG 10 and comprises twelve discrete electrodes 16 and a central star electrode 18 as best seen in FIGS. 3 and 5. The discrete electrodes 16 are distributed in groups of six for each degenerate mode. Specifically, two electrodes 16 were used as a forcer and four were used as a pick-off for each degenerate mode, giving a total of four electrodes 16 used as a forcer and eight as a pick-off shown in FIG. 5.

The central star-shaped electrode 18 is used for parametric pumping. Due to the twelve-pointed circular nature of this electrode, parametric pumping has equal contribution to the both degenerate n=3 wineglass modes. The central electrode 18 has two primary functions: (1) it acts as a shield by sinking parasitic currents between adjacent discrete electrodes 16, and (2) it can function as a DC quadrature null electrode as it forms a capacitive gap 34 within the gyroscope 10 at twelve points at a 15 degree offset from the discrete electrodes 16. This eliminates the need for any of the twelve discrete electrodes 16 to be assigned for quadrature null electrodes and hence allows all twelve discrete electrodes 16 to be dedicated as a forcer or pick-off electrode.

All axi-symmetric MEMS gyroscope architectures are capable of whole angle mechanization. Typically, these architectures utilize two sets of drive electrodes for the two resonant modes of the gyroscope. As a result, amplitude control in whole angle mechanization would require finding the orientation of the standing wave and pumping energy along this direction using two sets of drive electrodes (vector drive). However, this method is susceptible to drift due to gain unbalance in drive electronics, errors in calculating the angle of the standing wave, as well as, the time delay between estimation of the standing wave and the actual amplitude command.

A parametric drive for amplitude control of MEMS rate integrating gyroscopes have previously been reserved for high performance macro-scale vibratory gyros. In contrast to conventional amplitude control, a single drive channel connected to the central star electrode 18 of the gyroscope 10 was utilized for amplitude control of both modes (scalar drive). Even though a single drive channel is used, due to the parametric pumping effect, energy added to each (x and y) mode is proportional to the existing amplitude of the respective mode. This permits amplitude control of the standing wave at any arbitrary angle with minimal amount of perturbation. The scalar nature of the amplitude controller helps bypass errors associated with finding the orientation of the standing wave, time delay in the calculation, and x-y drive gain drift.

Figure 6:
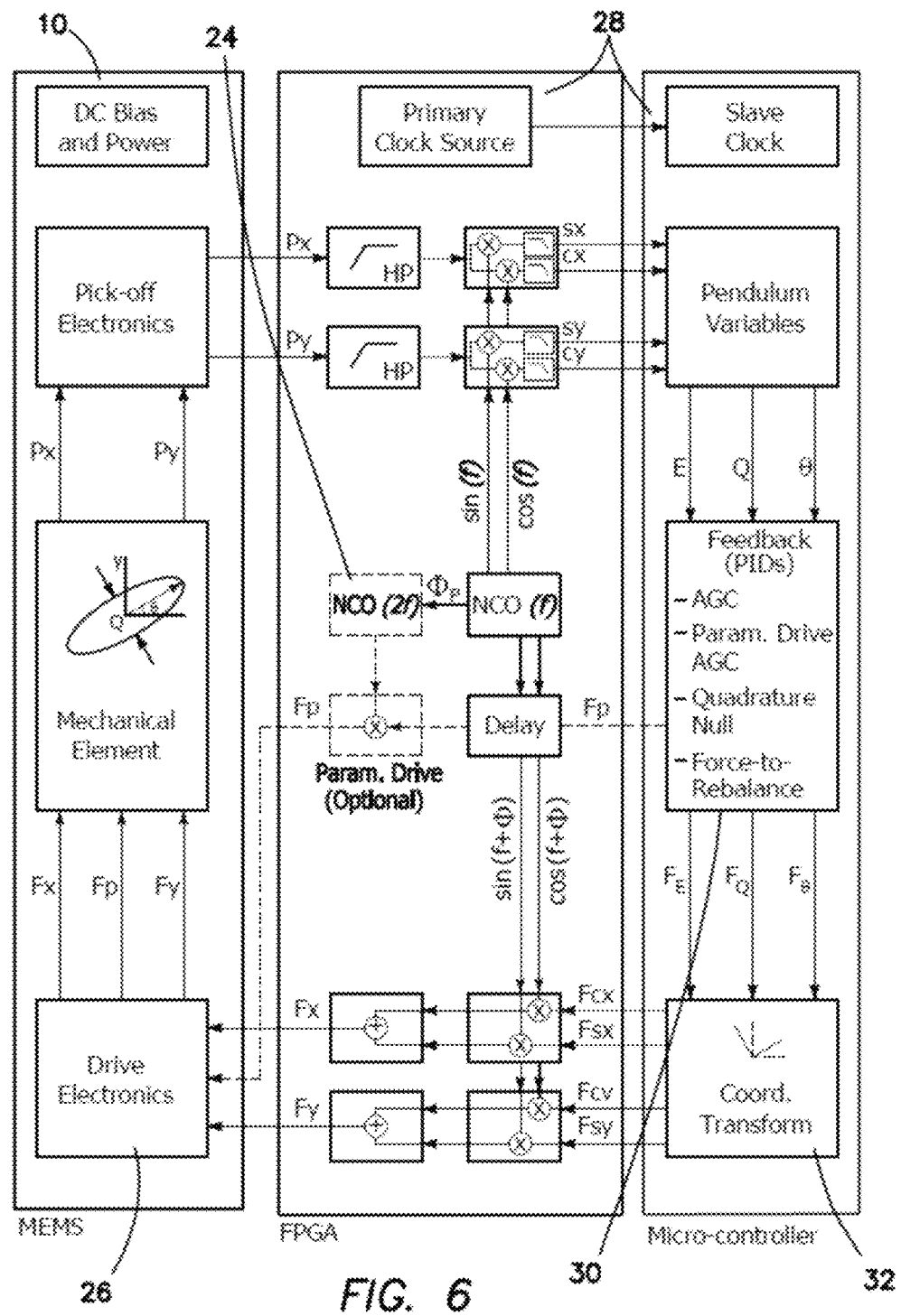
FIG. 6 is a flow chart representing the operation of the gyroscope and its corresponding field-programmable gate array.

For the parametric drive, a secondary numerically controlled oscillator (NCO) 24 is used to generate a sine wave at twice the PLL frequency. This signal is applied to the drive electronics 26 of the central star-shaped electrode 18 to parametrically pump energy in the x-y plane at twice the resonance frequency as seen in FIG. 6. Due to the parametric pumping effect, energy added to each (x and y) mode is proportional to the existing amplitude of the respective mode:

$$\ddot{x} + \frac{\omega_x}{Q_x}\dot{x} + \left(\omega_x^2 + \frac{F_p}{m_{eq}}\sin(2\omega t + \phi_p)\right)x = \frac{F_x}{m_{eq}}\sin(\omega t + \phi_f) + 2\eta\dot{y}\Omega_z, \quad (1)$$

$$\ddot{y} + \frac{\omega_y}{Q_y}\dot{y} + \left(\omega_y^2 + \frac{F_p}{m_{eq}}\sin(2\omega t + \phi_p)\right)y = \frac{F_y}{m_{eq}}\sin(\omega t + \phi_f) - 2\eta\dot{x}\Omega_z, \quad (2)$$

where $\omega_x$, $\omega_y$ are the resonance frequencies and $Q_x$, $Q_y$ are the Q-factors of the two degenerate modes, $m_{eq}$ is the equivalent mass of the vibratory system, $\eta$ is the angular gain factor, $\omega$ is the drive frequency and $\Phi_p$, $\Phi_f$ are the phase of the parametric and vector drives respectively.

This creates a preferential direction of pumping along the orientation of the standing wave without the need for any coordinate transformation around $\Theta$:

$$\theta = \arctan\left(\frac{y}{x}\right). \quad (3)$$

An additional benefit of parametric drive of MEMS gyroscopes is the minimization of the electrical feed-through between the actuation and pick-off channels. For a conventional MEMS gyroscope, actuation and pick-off signals occur at the same frequency. Any feed-through from the actuation signal will corrupt the pick-off channel, lowering overall performance of the system. Parametric drive mitigates this problem by separating the frequency of drive and pick-off channels. Since parametric drive frequency is a multiple of systems drive frequency, the electrostatic feed-through into the sense channel can be filtered out.

A hybrid field-programmable gate array (FPGA)/microcontroller control system 28 was developed for whole-angle gyro control. The control system is responsible for driving the gyroscope to a constant amplitude, suppressing the quadrature error, tracking/—controlling the orientation of the precession pattern.

The key component of this approach is a phase locked loop (PLL) that tracks the gyro motion at any arbitrary pattern angle as opposed to locking onto one of the primary gyro axis as seen in FIG. 5. Once the PLL track is established, the FPGA 28 demodulates in-phase and in-quadrature signals from x and y channels. From these demodulated signals the slow moving variables: amplitude (E), quadrature error (Q), and pattern angle ($\Theta$) can be extracted using the equations:

$$E = c_x^2 + s_x^2 + c_y^2 + s_y^2, \quad (4)$$

$$Q = 2(c_x s_y - c_y s_x), \quad (5)$$

$$R = c_x^2 + s_x^2 - c_y^2 - s_y^2, \quad (6)$$

$$S = 2(c_x c_y + s_x s_y), \quad (7)$$

$$L = c_x^2 - s_x^2 + c_y^2 - s_y^2 + 2i(c_x s_x + c_y s_y), \quad (8)$$

where E is a measure of energy within the system and is used for amplitude stabilization and Q is the measure of quadrature error, independent of drive orientation.

Imaginary component of L is a measure of phase error and used to establish a phase lock to the vibratory motion of the gyroscope 18. R and S are the projections of pattern angle on x and y axis and can be used to find the orientation of the precession pattern using:

$$\theta = \frac{1}{2}\arctan\left(\frac{S}{R}\right). \quad (9)$$

A PID controller 30 acts on each of these variables. These are Amplitude Gain Control (AGC) acting on E, quadrature null acting on Q and force-to-rebalance (FRB) that controls pattern angle (Θ). For the whole angle mechanization, FRB is disabled so that the standing wave is free to process. Once the correct command voltages $F_E$; $F_Q$ and $F_\Theta$ are established, a coordinate transform 32 around Θ is performed to align these signals to the standing wave pattern:

$$F_{cx} = F_E \cdot \cos(\theta) - F_\Theta \cdot \sin(\theta), \quad (10)$$

$$F_{cy} = F_E \cdot \sin(\theta) + F_\Theta \cdot \cos(\theta), \quad (11)$$

$$F_{sx} = -F_Q \cdot \sin(\theta), \quad (12)$$

$$F_{sy} = F_Q \cdot \cos(\theta), \quad (13)$$

This is followed by modulation of the command voltages at the PLL frequency. A set amount of phase delay is also added during modulation so that the total phase of the feed-back system is a multiple of 360°.

Open loop parametric drive is typically unstable for nominal drive amplitudes, which causes the gyro amplitude to increase exponentially for a fixed parametric drive signal. For this reason a secondary AGC controls the parametric drive voltage as to keep the gyro amplitude stable. This closed loop operation permits parametric drive of the gyro at a wide range of drive amplitudes, outside the stability boundary of open loop parametric drive.

Typical gyro startup procedure begins with driving the gyro 18 to a preset amplitude using conventional (at resonance) drive. Once the PLL and AGC stabilize, the drive signal is disabled and immediately parametric drive AGC is enabled. This switch occurs within one clock cycle of the FPGA 28 and eliminates over-shoots in drive amplitude, which would otherwise occur while starting up the high-Q resonator.

Figure 7:
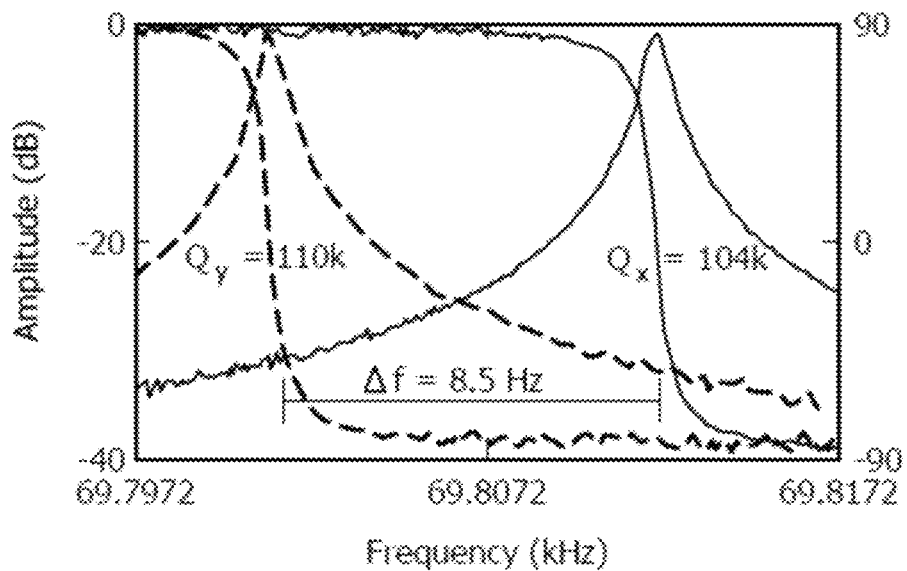
FIG. 7 is a graph representing the amplitude versus frequency of a frequency sweep showing the n=3 wineglass modes with a Q-factor above 100 k at a central frequency of 69.8 kHz.

Devices were wirebonded to ceramic Leadless Chip Carriers (LCCs) and instrumented with discrete electronics. Electromechanical Amplitude Modulation (EAM) at 1 MHz was used to mitigate the effects of parasitic feed through on the pick-off electronics. DC bias voltage of 1V on both modes and AC voltage of 20 mV was used for initial characterization. Frequency response characterization of the fabricated gyroscopes 10 revealed a Q-factor of >100,000 on both n=3 modes at about 70 kHz center frequency. FIG. 7 shows a plot of amplitude versus frequency when a frequency sweep showing the n=3 wineglass modes is done, demonstrating a Q-factor above 100 k at a central frequency of 69.8 kHz.

As fabricated frequency split (Δf) of four TRGs 10 were also characterized. The lowest frequency split observed was 8.5 Hz as seen in FIG. 7, (Δf/f=122 ppm) with a mean frequency split of 21 Hz ((Δf/f=300 ppm) across four devices. Table 2 below lists the as-fabricated frequency symmetry of the four example TRGs 10. Low frequency split is attributed to robustness of the high order (n=3) wineglass mode to fabrication imperfections and the ultra-clean EpiSeal process.

TABLE 2

| Device # | Δf (Hz) | f (kHz) | Δf/f (ppm) |
|---|---|---|---|
| # 1 | 8.5 | 69.75 | 122 |
| # 2 | 11 | 69.69 | 158 |
| # 3 | 25 | 71.29 | 350 |
| # 4 | 40 | 69.4 | 576 |

Figure 8:
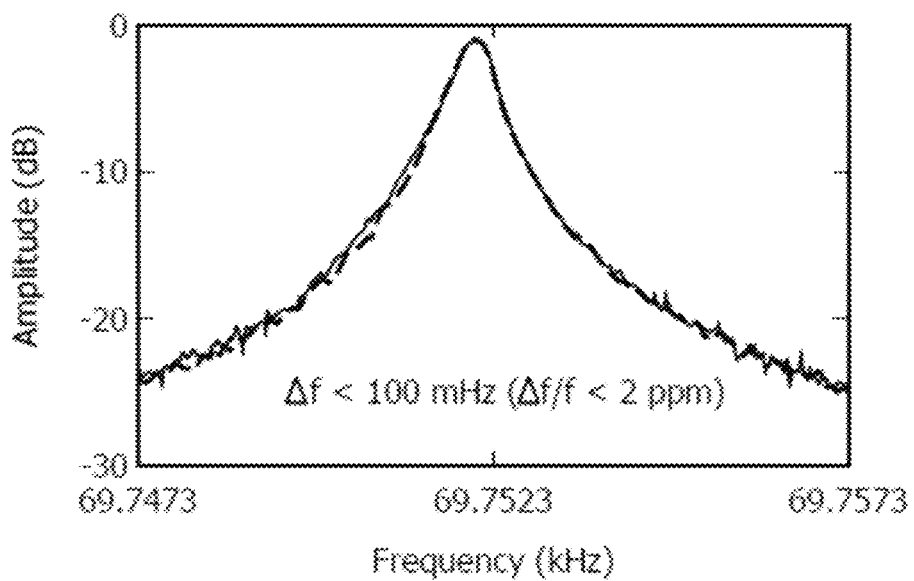
FIG. 8 is a graph representing the amplitude versus frequency of an electrostatic tuning of the gyroscope with 3.26V and 0.5V resulting in $\Delta f$<100 mHz.

After initial characterization the frequency split was further reduced using electrostatic tuning of DC bias on forcer and quadrature null electrodes. DC bias voltages of 3.26V and 0.5V was sufficient to reduce the frequency split to <100 mHz (Δf/f<2 ppm) as seen in FIG. 8.

For force-to-rebalance operation, an ADAU1442 DSP board from Analog Devices was used to implement the control algorithms. A 24-bit audio codec (AD1938) operating at 192 kHz sampling rate was used for forcer and pick-off signals. An Arduino Due micro-controller board was interfaced with the DSP board over I2S protocol, which was used to down-sample the gyro output and transmit over RS232 protocol for data acquisition.

Figure 9:
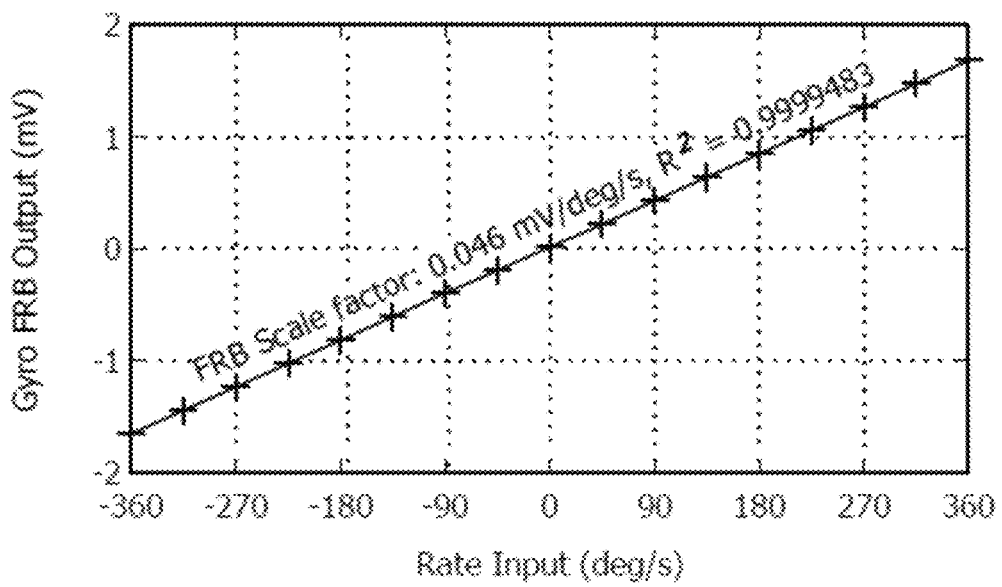
FIG. 9 is a graph representing the scale factor of the gyroscope in force-to-rebalance mode, specifically gyro FRB output versus rate input.
Figure 10:
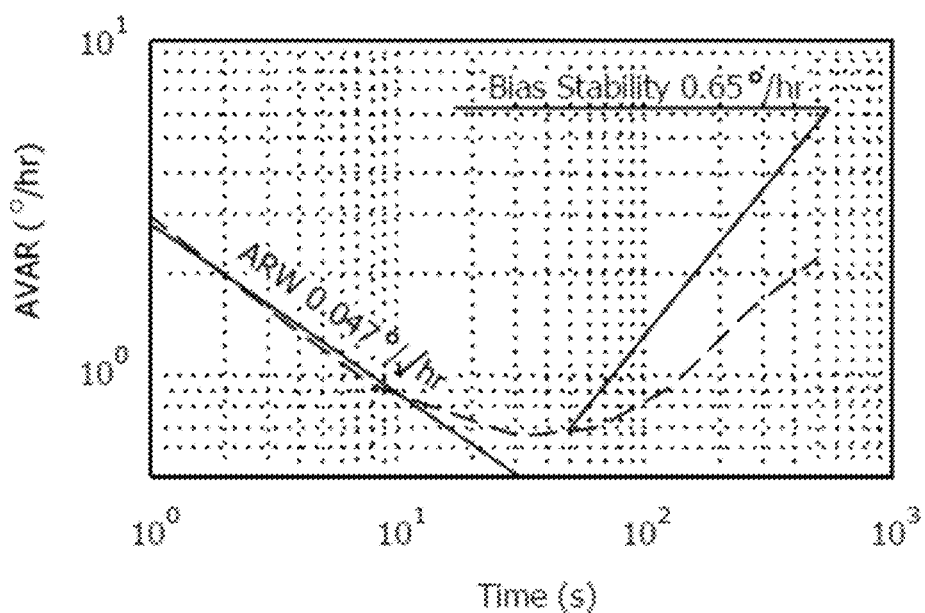
FIG. 10 is a graph representing the Allan deviation of force-to-rebalance output of the gyroscope, specifically AVAR versus time.

To evaluate rate gyro performance, the pattern angle was locked to X axis by enabling the FRB loop. A force-to-rebalance scale factor of 0.046 mV/(°/s) was observed with a linearity of R2=0:9999483 within 360°/s range as demonstrated in FIG. 9. Alan variance analysis of FRB output revealed ARW of 0:047 °/√h and an in-run bias stability of 0.65°/h at 32 s integration time as seen in FIG. 10.

Pattern angle data for the gyroscope 10 was obtained by changing the orientation of the standing wave (Θ) using the force-to-rebalance loop and recording the gyro state with respect to pattern angle (Θ). By changing the pattern angle from 0° to 360° in a continuous fashion and recording the output of PLL, AGC, quadrature null and force-to-rebalance command signals polar plots seen in FIGS. 11A-11C can be created. As a result, each polar plot shows the output of a particular control loop at the prescribed drive orientation.

Figure 11A:
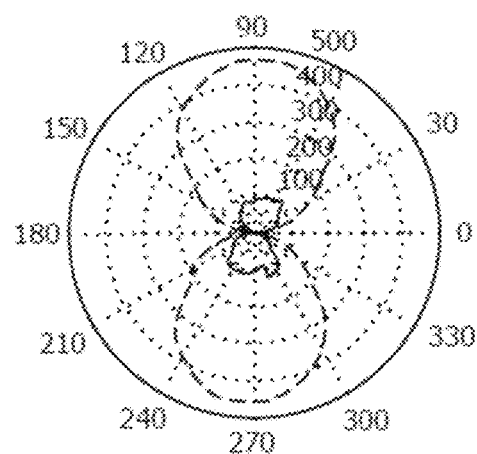
FIG. 11A is a chart and a bar graph of the tuning of the gyroscope based on residuals of pattern angle data, specifically PLL frequency ($\Delta f$) with respect to pattern angle (mHz).
Figure 11A:
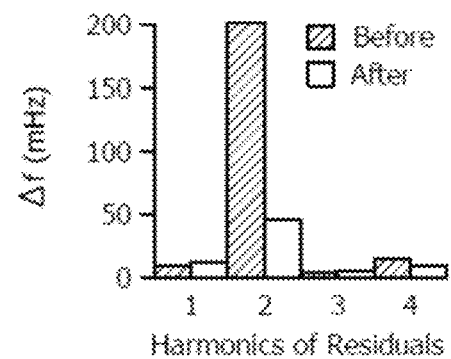
Figure 11B:
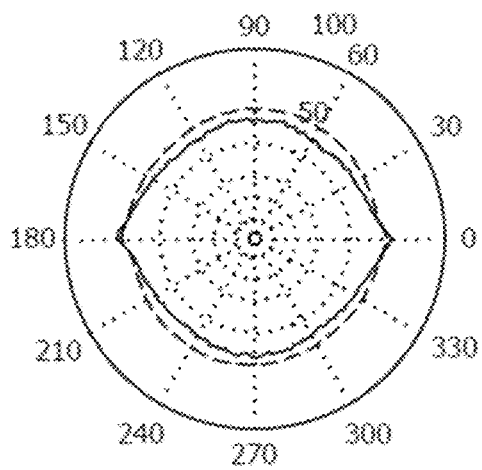
FIG. 11B is a chart and a bar graph of the tuning of the gyroscope based on residuals of pattern angle data, specifically parametric drive amplitude gain control (AGC) output with respect to pattern angle.
Figure 11B:
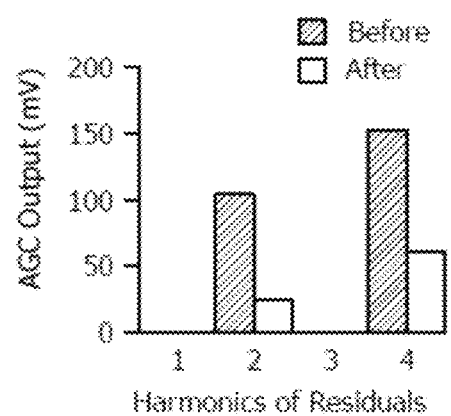
Figure 11C:
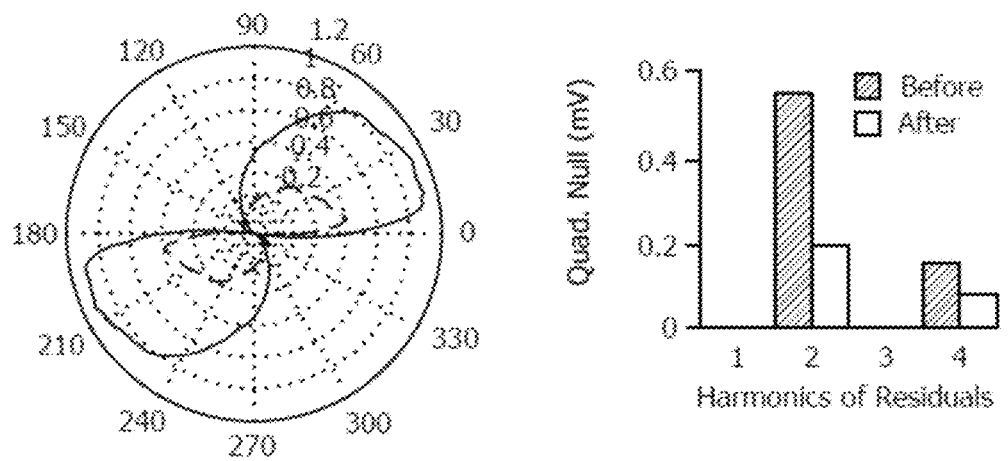
FIG. 11C is a chart and a bar graph of the tuning of the gyroscope based on residuals of pattern angle data, specifically quadrature null control output with respect to pattern angle.

Variation of command signals across pattern angle is a measure of imperfections within the gyroscope 10. And as can be seen in FIGS. 11A-11C, these variations are sinusoidal in nature. For this reason Fourier series expansion of pattern angle data from PLL, quadrature, and AGC loops was used for calibrating the gyro 10. For example, second harmonic of the PLL output provides run-time identification of the frequency split (Δf), which was used to tune the frequency split down to 50 mHz (700 ppb). Parametric AGC command signal displayed a 2 mV (about 4%) variation on second harmonic, which was attributed to pick-off gain unbalance between x and y modes. Adjusting the pick-off gains in the FPGA, we were able to reduce this unbalance down to <0.5 mV. The combined effect of tuning the frequency split and the pick-off gain unbalance resulted in an overall 25x reduction in the required quadrature null command signal as seen FIGS. 11A-11C.

Figure 12:
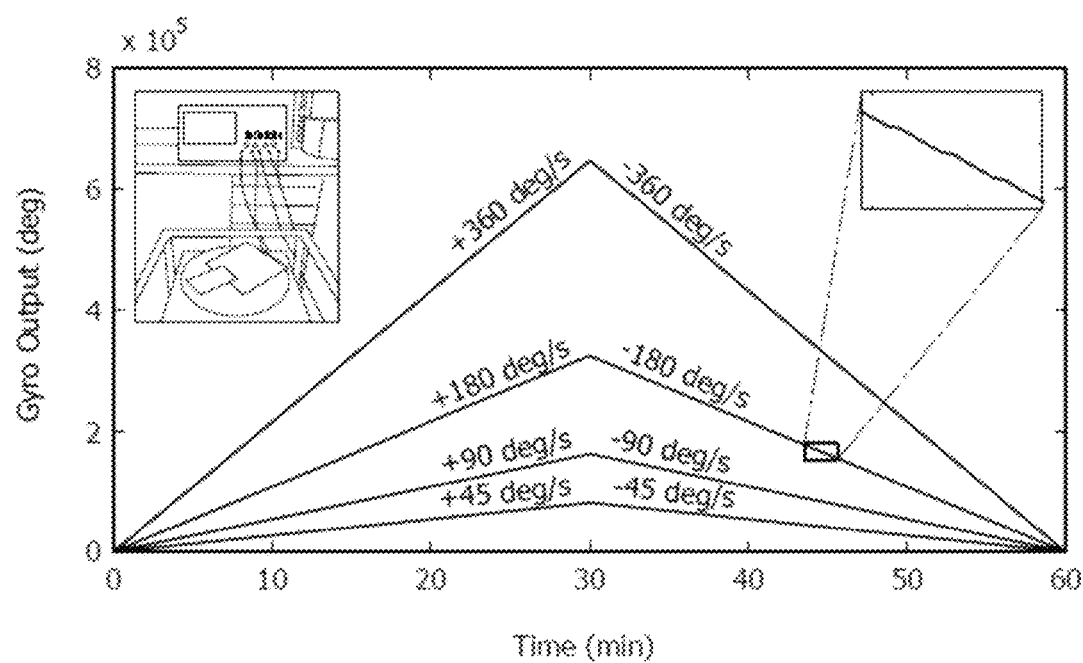
FIG. 12 is a graph of gyroscope output versus time showing the experimental demonstration of rate integrating operation under parametric drive.
Figure 13:
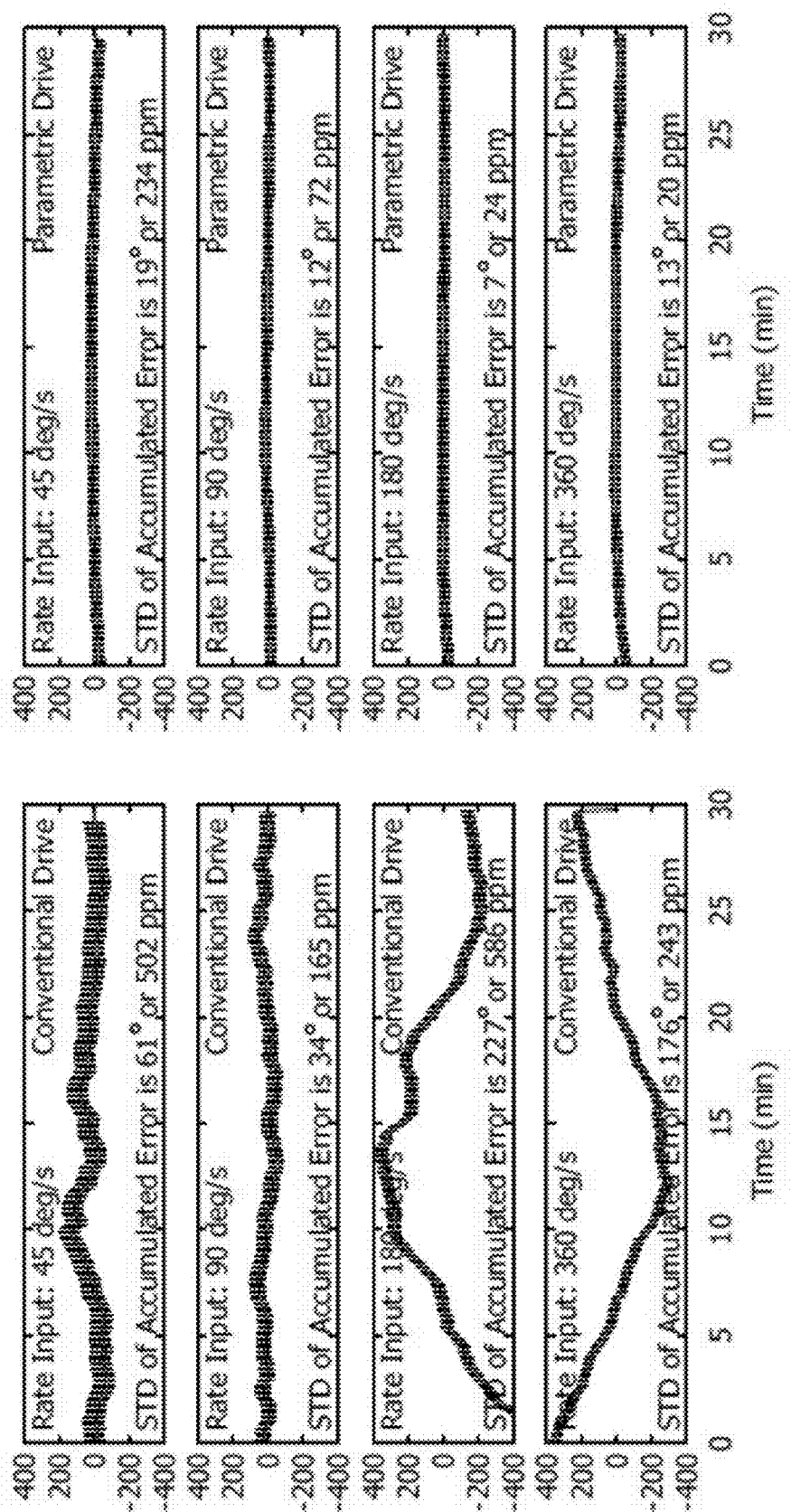
FIG. 13 is a series of graphs comparing the residual errors for gyroscopes comprising a conventional drive and gyroscopes comprising a parametric drive for rate inputs of 45, 90, 180, and 360 degrees per second, respectively.

In order to test the rate integrating operation, the gyro 10 was driven using parametric drive and a constant rotation rate was applied for 1 hour, switching the direction at 30 minutes mark. FIG. 12 shows the unwrapped gyro response for four different speeds. This experiment was later repeated using conventional (vector) drive. A linear fit to the data revealed a combined electrical/mechanical angular gain factor of approximately 0.6. Comparison of residuals from both experiments is shown in FIG. 13. For all rate inputs the parametric drive resulted in better scale factor stability compared to conventional drive architecture. As predicted, the highest difference between conventional drive and parametric drive occurred at higher rotation rates. Time lag in calculation of the drive vector becomes more important at higher rotation rates as this lag can cause the drive vector to couple into the gyro output. As a result, any change in the drive vector amplitude either due to drive gain drifts or a Q-factor change in the resonator element can affect scale factor stability.

For 360°/s rate input over a 30 min period standard deviation of accumulated error for conventional drive was 176° versus 13° for parametric drive. This resulted in 14× improvement for parametric drive and <20 ppm scale factor stability overall, without any compensation or temperature stabilization.

In summary, parametric drive of a MEMS rate integrating gyroscope 10 was presented for the first time. Parametric pumping was used to bypass the errors associated with finding the orientation of the standing wave and the time delay in the calculation and drift in gain of x-y drive electronics. This resulted in as high as 14× improvement in scale factor stability compared to conventional x-y drive and better than 20 ppm scale factor stability without any compensation or temperature stabilization. In addition, parametric drive reduces drive to pick-off electrical feed-through by creating a frequency separation between drive and pick-off channels.

A Toroidal Ring Gyroscope 10 with Q-factor above 100,000 at central frequency of approximately 70 kHz was designed and implemented in wafer-level epitaxial silicon encapsulation process. The gyroscope 10 comprises of a robust ring anchor 12 and a distributed suspension system 14. As seen in FIG. 3, the ring anchor 12 is substantially ring, toroidal, or annular shaped, namely it is a component which is defined or bounded by two concentric circles. Similarly, the overall shape of the distributed suspension system 14 is also substantially ring, toroidal, or annular shaped as seen in FIG. 3. In contrast to axi-symmetric designs with central support structures, the vibrational energy in the introduced design is concentrated towards the innermost ring 22', and the device 10 is anchored at the outer perimeter. The distributed suspension system 14 prevents vibrational motion propagating to the outer anchor 12, which helps trap the vibrational energy within the gyroscope 10. Combined with the ultra-clean EpiSeal process Q-factors above 100,000 were obtained at about 70 kHz and a compact size of 1760 μm without using getter materials.

Frequency splits (Δf) as low as 8.5 Hz (Δf/f=122 ppm) and a mean frequency split of 21 Hz (Δf/f=300 ppm) were observed across four devices. Low frequency split is attributed to the ultra-clean EpiSeal process and robustness of the high order (n=3) wineglass mode to fabrication imperfections, at the cost of potential decrease in angular gain factor and vibration amplitude.

Whole angle and pattern angle control loops were implemented on a custom FPGA system. Characterization of the gyro performance using force rebalance mechanization revealed ARW of 0.047°/√h and an in-run bias stability of 0.65° h. Due to the high Q-factor, degenerate mode operation on n=3 modes and robust support structure, the device can potentially be instrumented for high-g environments that require high angular rate sensitivity.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A micromachined Coriolis vibratory ring gyroscope comprising:
   a toroidal outer anchor;
   a distributed suspension system having an innermost portion, disposed within the toroidal outer anchor, and concentrically coupled to the outer anchor; and
   an electrode assembly disposed in the center of the distributed suspension system and having a capacitive gap between the electrode assembly and the innermost portion of the distributed suspension system, the electrode assembly driving the distributed suspension system into oscillation by electrostatic forces, where the electrode assembly driving the distributed suspension system into oscillation by electrostatic forces comprises an electrode assembly driving the gyroscope in any of a plurality of wineglass modes provided that the wineglass mode shape has a degenerate mode pair.

2. The gyroscope of claim 1 where the distributed suspension comprises a plurality of concentrically disposed rings coupled to one another.

3. The gyroscope of claim 2 where the plurality of concentrically disposed rings comprises a concentrically disposed innermost ring which has a greater thickness than the other ones of the plurality of concentrically disposed rings.

4. The gyroscope of claim 3 wherein the capacitive gap between the innermost portion of the distributed suspension system and the electrode assembly comprises a capacitive gap between the innermost ring of the distributed suspension system which has greater thickness and the driving electrode assembly.

5. The gyroscope of claim 2 where the plurality of concentrically disposed rings are coupled to one another via a plurality of radially disposed spokes.

6. The gyroscope of claim 1 where the electrode assembly comprises:
   a central star electrode; and
   at least eight discrete electrodes symmetrically disposed radially around the central star electrode.

7. The gyroscope of claim 6 wherein at least four of the at least eight discrete electrodes are forcer electrodes.

8. The gyroscope of claim 6 wherein at least four of the at least eight discrete electrodes are pick-off electrodes.

9. The gyroscope of claim 6 wherein the central star electrode is configured for parametric pumping of the distributed suspension system.

10. The gyroscope of claim 1 further comprising a microcontroller configured to drive the gyroscope at a constant amplitude, suppress a quadrature error, and track and control orientation of a precession pattern of the gyroscope.

11. The gyroscope of claim 1 further comprising a Q factor of at least 100,000 and an overall diameter of no more than 1760 µm.

12. A micromachined Coriolis vibratory ring gyroscope comprising:
   a toroidal outer anchor;
   a distributed suspension system having an innermost portion, disposed within the toroidal outer anchor, and concentrically coupled to the outer anchor; and
   an electrode assembly disposed in the center of the distributed suspension system and having a capacitive gap between the electrode assembly and the innermost portion of the distributed suspension system, the electrode assembly driving the distributed suspension system into oscillation by electrostatic forces, where the distributed suspension comprises a plurality of concentrically disposed rings coupled to one another, and where the plurality of concentrically disposed rings comprises a concentrically disposed innermost ring which has a greater thickness than the other ones of the plurality of concentrically disposed rings.

* * * * *